May 12, 1925.  W. J. MacLELLAN  1,537,362
STEERING STABILIZER
Filed Aug. 2, 1923
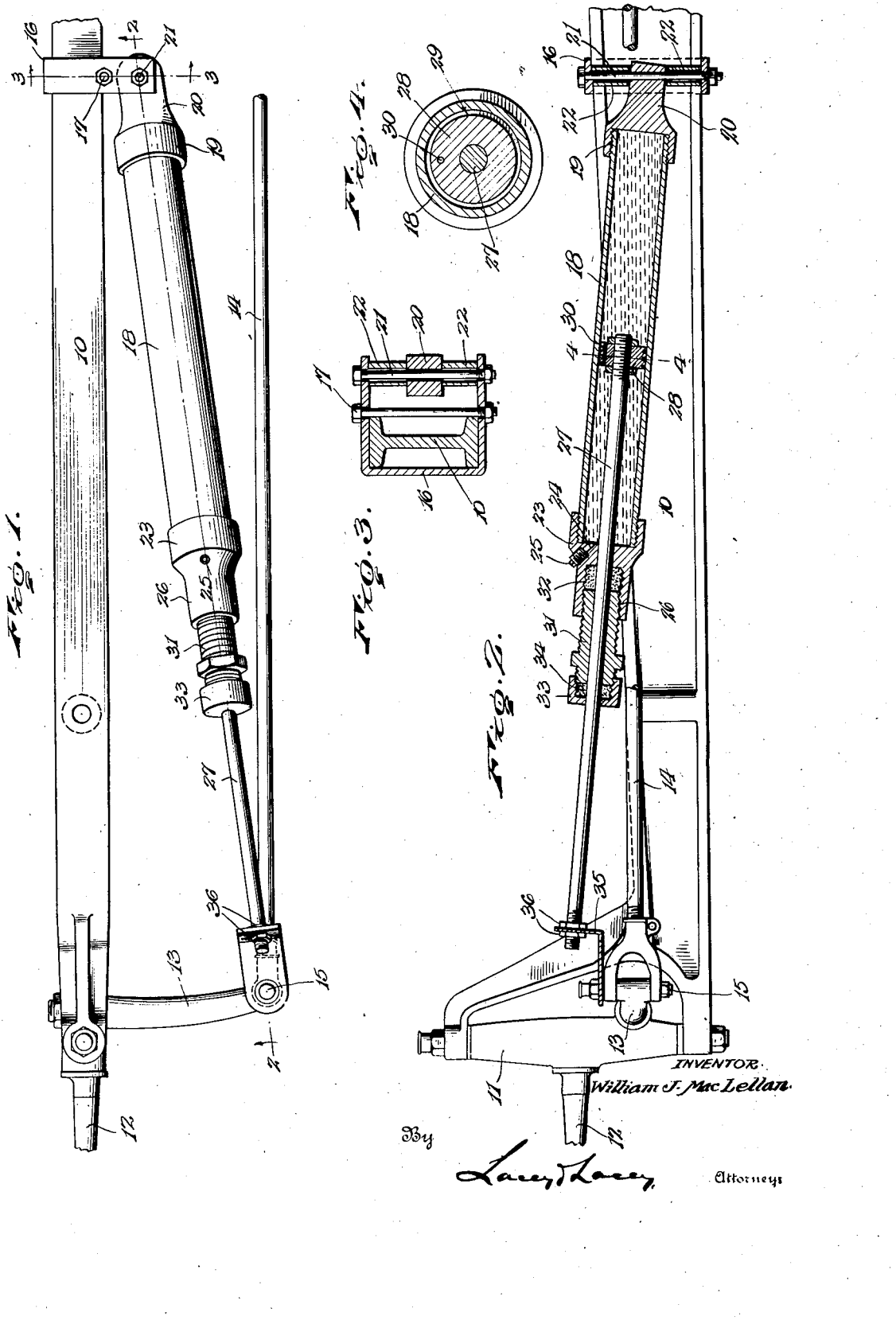
INVENTOR
William J. MacLellan
By Lacey & Lacey,
Attorneys Patented May 12, 1925.

1,537,362

UNITED STATES PATENT OFFICE.

WILLIAM J. MacLELLAN, OF LONG BEACH, CALIFORNIA.

STEERING STABILIZER.

Application filed August 2, 1923. Serial No. 655,335.

*To all whom it may concern:*

Be it known that I, WILLIAM J. MAC-LELLAN, a citizen of the United States, residing at Long Beach, in the county of Los Angeles and State of California, have invented certain new and useful Improvements in Steering Stabilizers, of which the following is a specification.

This invention relates to an improved steering stabilizer for motor vehicles and seeks, among other objects, to provide a device which will function to hold the vehicle to a steady course and prevent wabbling of the front wheels of the vehicle.

A further object of the invention is to provide a device which may be readily applied to vehicles already in use without the necessity for any structural change therein.

And the invention has as a still further object, to provide a device which will be characterized by structural simplicity and may, accordingly, be produced and sold at moderate cost.

Other and incidental objects will appear hereinafter.

In the drawings:

Figure 1 is a plan view showing my improved device applied,

Figure 2 is a sectional view taken longitudinally through the device,

Figure 3 is a transverse sectional view on the line 3—3 of Figure 1, looking in the direction of the arrows, and Figure 4 is a transverse sectional view on the line 4—4 of Figure 2.

Referring now more particularly to the drawings, I have, for convenience, shown my improved stabilizer in connection with the front axle 10 and associated parts of a conventional motor vehicle. Mounted on the ends of the axle are the usual steering knuckles, one of which is shown at 11. These knuckles carry the front spindles, one of which is shown at 12, and extending rearwardly from the knuckles are the usual spindle arms, one of which is shown at 13. Coupling said arms is the customary connecting rod 14 of the vehicle steering mechanism connected at its adjacent end to the arm 13 by the usual pivot bolt 15.

Coming now more particularly to the subject of the present invention, I employ a U-shaped clamp 16 which is formed to straddle the axle 10, and extending through the arms of the clamp at the rear of the axle is a bolt 17 binding the clamp upon the axle. Mounted upon the clamp is a dash pot including a cylinder 18 closed at its inner end by a cap 19 preferably screwed upon the cylinder, and integrally formed on said cap is an elongated head 20 projecting longitudinally of the cylinder. Extending between the arms of the clamp 16 near their outer ends through said head, is a pivot bolt 21 and surrounding the bolt above and below the head are spacing sleeves 22 centering the head upon the bolt medially of the axle 10. In this connection, it is to be noted that the opening through the head which accommodates the bolt 21 is tilted so that the cylinder 18 is supported to incline upwardly toward its outer end with respect to the axle.

Screwed upon the cylinder 18 at its outer end is a cap 23 having a filling opening 24 for the cylinder normally closed by a threaded plug 25. Rising from the cap is an annular flange 26 and slidable through the cap is a piston rod 27 to the inner end of which is fixed a piston 28 fitting the cylinder. In use, the cylinder is filled with oil and formed in the periphery of the piston are spaced annular grooves 29 in which the oil may enter for cushioning the piston and perfecting the joint between the piston and the cylinder. The piston is further provided with a passage 30 therethrough so that the oil may flow through the piston from each side thereof to the other, this passage being relatively small so that sudden movement of the piston in either one direction or the other will be checked by the oil. Screwed into the flange 26 of the cap 23 is a sleeve 31 slidably accommodating the piston rod 27 therethrough and co-operating with said flange to form a gland for the piston rod, a suitable packing 32 being arranged within the flange so that the sleeve may be adjusted for compressing the packing about the piston rod. Screwed upon the sleeve at its outer end is a cap 33 also slidably receiving the piston rod therethrough and confined within said cap is a suitable packing 34. Accordingly, the cap may be adjusted for compressing this packing about the piston rod, the cap and packing providing a second gland for said rod. Leakage of oil from the cylinder about the piston rod will accordingly be effectually prevented. Secured at one end by the bolt 15 is an angle plate 35 resting upon the yoke at the adjacent end of the connecting rod 14. As brought out in Figure 2, the plate is apertured at one end to receive the bolt therethrough and is clamped beneath the head of the bolt while the opposite end of the plate is apertured to freely accommodate the outer end of the piston rod, and screwed upon said rod are nuts 36 confronting opposite sides of the plate rigidly connecting the rod with the plate. Accordingly, as will be seen, the device is coupled with the steering knuckles of the vehicle in such manner that the device will resist wabbling of the front wheels of the vehicle and normally hold the vehicle steadily upon a given course.

Having thus described the invention, what is claimed as new is:

In a steering stabilizer, the combination of a U-shaped clamp adapted to straddle an axle, means to extend transversely through the free ends of the clamp abutting the axle limiting the clamp against endwise movement from the axle and adjustable for binding the clamp upon the axle, a hydraulic cylinder provided at one end with a cap terminating in a head having an inclined opening therethrough, a vertically disposed bolt extending transversely through the free ends of the clamp and through said opening in spaced relation to the axle pivotally mounting the cylinder to incline upwardly towards its free end, spacing sleeves upon the bolt at opposite sides of the head centering the head thereon, a piston in said cylinder and having a piston rod, and means adapted to form a connection between said rod and a vehicle steering arm.

In testimony whereof I affix my signature.

WILLIAM J. MacLELLAN. [L. S.]